US012806715B2

(12) United States Patent
Abdi et al.

(10) Patent No.: US 12,806,715 B2
(45) Date of Patent: Nov. 24, 2026

(54) LASER MICROJET WITH IN-LINE CAMERA

(71) Applicant: RTX Corporation, Farmington, CT (US)

(72) Inventors: Ahmed Abdillahi Abdi, Oceanside, CA (US); Andrew Joseph Lazur, La Jolla, CA (US)

(73) Assignee: RTX Corporation, Farmington, CT (US)

( * ) Notice: Subject to any disclaimer, the term of this patent is extended or adjusted under 35 U.S.C. 154(b) by 652 days.

(21) Appl. No.: 18/229,803

(22) Filed: Aug. 3, 2023

(65) Prior Publication Data

US 2025/0041968 A1 Feb. 6, 2025

(51) Int. Cl.

| | |
|---|---|
| ***B23K 26/14*** | (2014.01) |
| ***B23K 26/10*** | (2006.01) |
| ***B23K 26/142*** | (2014.01) |
| ***B23K 26/146*** | (2014.01) |
| ***B23K 26/70*** | (2014.01) |
| ***G06T 7/00*** | (2017.01) |
| ***H04N 23/90*** | (2023.01) |

(52) U.S. Cl.

CPC .......... *B23K 26/1476* (2013.01); *B23K 26/10* (2013.01); *B23K 26/142* (2015.10); *B23K 26/146* (2015.10); *B23K 26/70* (2015.10); *G06T 7/0004* (2013.01); *G06T 7/97* (2017.01); *H04N 23/90* (2023.01); *G06T 2207/30164* (2013.01)

(58) Field of Classification Search

CPC .. B23K 26/1476; B23K 26/10; B23K 26/382; G06T 7/97; G06T 7/0004

See application file for complete search history.

(56) References Cited

U.S. PATENT DOCUMENTS

| | | | | |
|---|---|---|---|---|
| 11,253,954 | B2 | 2/2022 | Onodera et al. | |
| 2005/0205778 | A1* | 9/2005 | Kitai | B23K 26/364 250/309 |
| 2011/0120981 | A1* | 5/2011 | Paganelli | B23K 26/147 219/121.67 |
| 2017/0361399 | A1* | 12/2017 | Toyama | B23K 26/032 |
| 2018/0161928 | A1* | 6/2018 | Hu | B23K 26/1494 |
| 2022/0362884 | A1 | 11/2022 | Yada | |

FOREIGN PATENT DOCUMENTS

| | | | | |
|---|---|---|---|---|
| DE | 19852302 | A1 | 5/2000 | |
| DE | 102016007586 | A1 * | 12/2017 | B05C 11/1021 |

OTHER PUBLICATIONS

Extended European Search Report for EP Application No. 24192694.8, dated Feb. 14, 2025, 8 pages.

* cited by examiner

*Primary Examiner* — Thien S Tran

(74) *Attorney, Agent, or Firm* — Kinney & Lange, P.A.

(57) ABSTRACT

A device for forming a feature in a workpiece includes a waterjet guided laser device translatable relative to the workpiece. The waterjet guided laser device includes a head assembly having a nozzle comprising an aperture for ejecting a waterjet with an internal laser beam, and a camera system comprising a plurality of cameras disposed about the nozzle.

18 Claims, 3 Drawing Sheets

LASER MICROJET WITH IN-LINE CAMERA

BACKGROUND

The present invention relates to ceramic matrix composites (CMCs), and more particularly, to means of machining CMCs.

CMCs are extremely hard and brittle and can therefore be hard to machine efficiently. Waterjet guided laser (i.e., laser microjet) technology is considered a promising manufacturing route for producing complex 3D holes in CMC parts. This technology works by transmitting a laser through a high-pressure water column to the surface of the part. Locating the waterjet nozzle to the part or fixture is accomplished by use of a retractable touch probe, off-set camera, or the water column itself. However, with particularly small holes and/or features, alignment via the touch probe and/or camera can be difficult due to physical interference between parts, especially those with nonplanar surfaces, and the nozzle head assembly. Thus, alternative means of alignment are desirable.

SUMMARY

A device for forming a feature in a workpiece includes a waterjet guided laser device translatable relative to the workpiece. The waterjet guided laser device includes a head assembly having a nozzle comprising an aperture for ejecting a waterjet with an internal laser beam, and a camera system comprising a plurality of cameras disposed about the nozzle.

A method of forming a feature in a workpiece includes orienting a waterjet guided laser device about the workpiece by capturing a plurality of images of the workpiece with a corresponding plurality of cameras, generating a composite image from the plurality of images, and aligning a nozzle of the waterjet guided laser device to the workpiece based on the composite image. The method further includes ejecting a waterjet from an aperture of the nozzle, and impinging the waterjet against the workpiece causing a corresponding removal of material therefrom.

Figure 1:
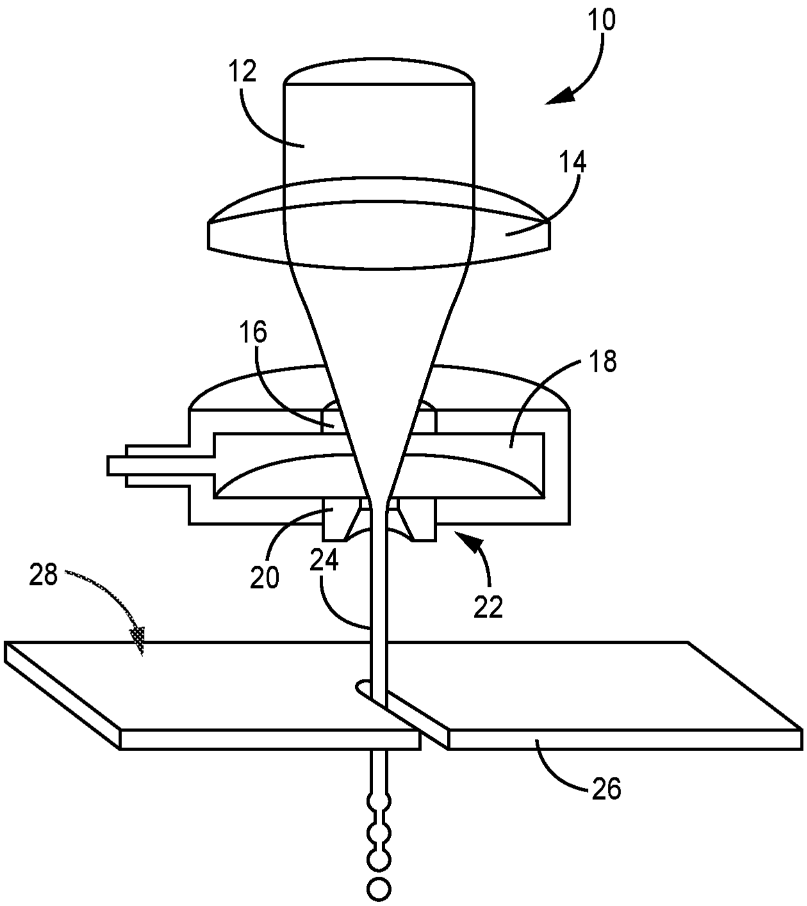
FIG. 1 is a simplified illustration of a waterjet guided laser device.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents means for aligning a waterjet nozzle aperture with a workpiece using an in-line camera system. The camera system includes multiple cameras disposed about the waterjet nozzle. Such a system can generate a composite image surrounding the nozzle to help center the nozzle aperture, and thereby the water column, over a feature of the workpiece surface.

FIG. 1 is a simplified illustration of waterjet guided laser device 10. Device 10 includes laser beam 12 from a laser source, focusing lens 14, window 16, pressurized water chamber 18, and nozzle 20. Nozzle 20 can be disposed within head assembly 22. In operation, laser beam 12 is focused by focusing lens 14 and window 16 as it reaches pressurized water chamber 18, which is filled with pressurized water. Cylindrical waterjet (i.e., water column) 24 with internally reflected laser beam 12 is ejected from nozzle 20 and impinges upon workpiece 26 causing removal of workpiece material along a predetermined tool path. Workpiece 26 can be a CMC part, such as an airfoil, platform, blade outer air seal (BOAS), etc., having one or a combination of planar and curved outer surfaces 28. Device 10 can be translatable along multiple axes with respect to workpiece 26. Workpiece 26 can be mounted on a rotatable or otherwise translatable base (not shown) to facilitate access to and alignment of outer surfaces 28.

Figure 2:
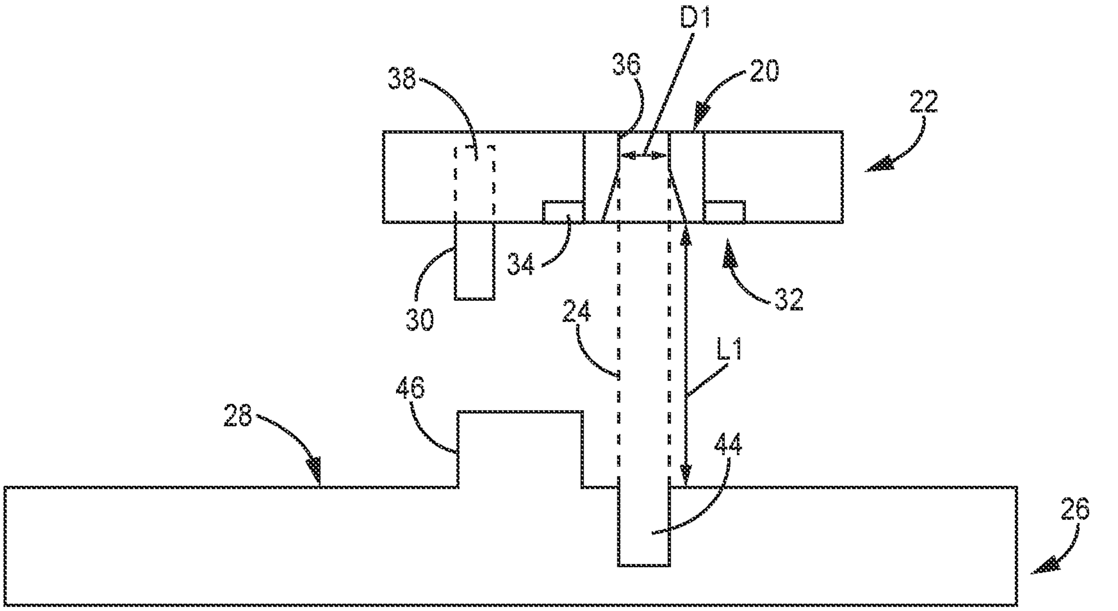
FIG. 2 is a simplified close-up view of a head assembly of the waterjet guided laser device.
Figure 3:
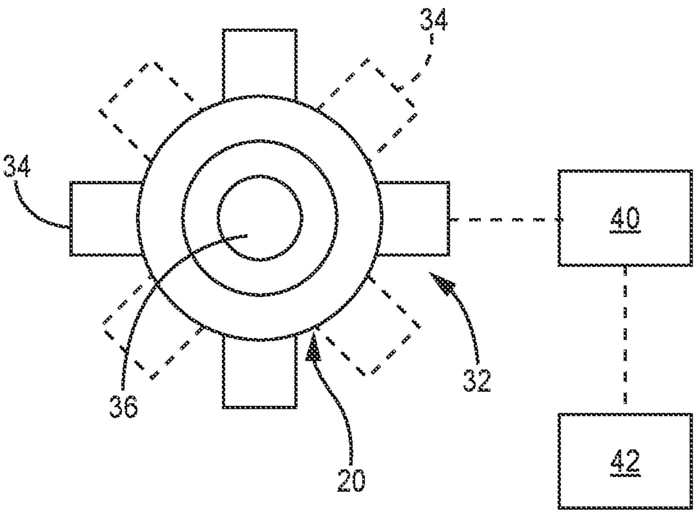
FIG. 3 is a simplified bottom plan view of a camera system of the waterjet guided laser device.

FIG. 2 is a simplified close-up view of head assembly 22, including touch probe 30 and camera system 32. FIG. 3 is a simplified bottom plan view of camera system 32, including multiple cameras 34. FIGS. 2 and 3 are discussed together.

Head assembly 22 can include nozzle 20, camera system 32 collocated with nozzle 20, and touch probe 30. Nozzle 20 can include aperture 36 having an aperture diameter DI. Aperture 36 controls the diameter of ejected cylindrical waterjet 24, represented in FIG. 2 with dashed lines. Diameter DI can range from 50 microns to 100 microns, and can be 70 microns in an exemplary embodiment. Touch probe 30 can be used to help align head assembly 22 with workpiece 26 for establishing a work coordinate system (WCS) used as a starting point for operation of system 10. Touch probe 30 can additionally and/or alternatively be used to insure the proper stand-off distance from surface 28 of workpiece 26. Touch probe 30 can be retractable and extendable relative to recess 38 within head assembly 22 such that touch probe 30 does not impede the multiaxial translation of head assembly 22 relative to workpiece 26. Touch probe can be offset from nozzle 20 a greater distance than cameras 34, which is discussed in greater detail below.

Camera system 32 can include at least one, and preferably, two to ten cameras 34 disposed about and proximate nozzle 20. In an exemplary embodiment, camera system 32 can include four to eight cameras 34. As shown in FIG. 3, camera system 32 includes four cameras 34 disposed generally equidistant from one another about nozzle 20. Four additional and optional cameras 34 are shown in dashed lines, as an alternative embodiment can include eight cameras 34. Cameras 34 can be generally flush with the lowest (i.e., downstream) surface of nozzle 20 such that each camera 34 can be offset from outer surface 28 a distance, or length L1 (FIG. 2), which is generally equal to the length of the cylindrical waterjet 24 after exiting nozzle 20 until reaching outer surface 28. Length L1 can range from 0.5 in (12.7 mm) to 1.5 in (38.1 mm) and can scale with diameter DI of aperture 36. For example, in an embodiment with a diameter DI of 70 microns, length L1 can be 0.75 in (19 mm). In general, length L1 will be the same for each camera 34 within system 32. In an alternative embodiment, each camera 34 can be partially to fully external to head assembly 22 (i.e., being relatively closer to workpiece 26 with respect to nozzle 20) such that L1 is less than the length of cylindrical waterjet 24.

Each camera 34 can be oriented in the direction of workpiece 26 for capturing an image of surface 28. Camera system 32 can further include processing device 40 in communication with each camera 34. Processing device 40 can include one or more field programmable gate arrays (FPGA), an application specific integrated circuits (ASIC), or microprocessors for performing image processing (e.g., cropping, scaling, etc.) as well as forming a composite image from the individual image of each camera 34. The composite image can be displayed on display 42 which can be associated with device 10. In some embodiments, each camera 34 can include a filter selective to the wavelength of laser beam 12 (FIG. 1) to allow cameras 34 to use optical information from laser beam 12 to further improve accuracy of alignment. Filters can additionally and/or alternatively filter wavelengths which otherwise might interfere with cameras 34.

In operation of device 10, one or more features 44 (FIG. 2) can be formed in workpiece 26. In one embodiment, features 44 can be metering holes. In some cases, workpiece 26 can be removed from its base for inspection, and such inspection might reveal imperfections in one or more features 44, such as an incomplete drill through the thickness of workpiece 26. In such case, the one or more features 44 can be considered incomplete and/or partially-formed features 44. Workpiece 26 can be remounted to its base for redrilling, however, it can be challenging to align nozzle 20 and aperture 36 to particularly small features 44, such as a metering hole, using just touch probe 30 and/or a single camera 34 proximate nozzle 20. Further, surface obstructions 46, such as a boss or other objected projecting away from outer surface 28 can interfere with the translation of head assembly 22 when attempting such an alignment. Camera system 32 with its multiple cameras 34 and composite imaging capabilities advantageously allow for a more precise alignment of aperture 36, and thereby cylindrical waterjet 24, with feature 44 for further drilling. Camera system 32 can additionally and/or alternatively be used for positioning of nozzle 20 during the initial drilling operation to establish the starting point of the WCS. In some cases, a small amount of material can be removed from outer surface 28 by briefly pulsing of cylindrical waterjet 24 prior to drilling/redrilling. This can create a visibly high-contrast region with which to confirm proper alignment.

The disclosed waterjet guided laser device can be used to form features in CMC components for use in aerospace, maritime, or industrial equipment, to name a few, non-limiting examples.

DISCUSSION OF POSSIBLE EMBODIMENTS

The following are non-exclusive descriptions of possible embodiments of the present invention.

A device for forming a feature in a workpiece includes a waterjet guided laser device translatable relative to the workpiece. The waterjet guided laser device includes a head assembly having a nozzle comprising an aperture for ejecting a waterjet with an internal laser beam, and a camera system comprising a plurality of cameras disposed about the nozzle.

The device of the preceding paragraph can optionally include, additionally and/or alternatively, any one or more of the following features, configurations and/or additional components:

In the above device, the head assembly can further include a retractable touch probe.

In any of the above devices, the aperture can have a diameter ranging from 50 microns to 100 microns.

In any of the above devices, the diameter can be 70 microns.

In any of the above devices, the camera system can include two cameras to ten cameras.

In any of the above devices, the camera system can include four cameras to eight cameras.

In any of the above devices, the camera system can include four cameras.

In any of the above devices, each of the plurality of cameras can be configured to capture a corresponding plurality of images of a workpiece.

In any of the above devices, the camera system can further include a processing device for generating a composite image from the plurality of images.

Any of the above devices can further include a display for displaying the composite image.

A method of forming a feature in a workpiece includes orienting a waterjet guided laser device about the workpiece by capturing a plurality of images of the workpiece with a corresponding plurality of cameras, generating a composite image from the plurality of images, and aligning a nozzle of the waterjet guided laser device to the workpiece based on the composite image. The method further includes ejecting a waterjet from an aperture of the nozzle, and impinging the waterjet against the workpiece causing a corresponding removal of material therefrom.

The method of the preceding paragraph can optionally include, additionally and/or alternatively, any one or more of the following features, configurations and/or additional steps:

In the above method, each of the plurality of cameras can be disposed about the nozzle.

Any of the above methods can further include positioning the waterjet guided laser device such that the plurality of cameras are offset a distance from the workpiece.

In any of the above methods, the distance can range from 0.5 in to 1.5 in.

In any of the above methods, the aperture can have a diameter ranging from 50 microns to 100 microns.

In any of the above methods, the plurality of cameras can include two cameras to ten cameras.

In any of the above methods, the plurality of cameras can include four cameras to eight cameras.

Any of the above methods can further include displaying the composite image on a display.

In any of the above methods, a processing device can generate the composite image.

In any of the above methods, the step of impinging the waterjet against the workpiece can include impinging the waterjet against a partially formed feature in the workpiece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A device for forming a feature in a workpiece, the device comprising:

a waterjet guided laser device translatable relative to the workpiece, the waterjet guided laser device comprising:

a head assembly comprising:

a nozzle comprising an aperture for ejecting a waterjet with an internal laser beam;

a camera system comprising a plurality of cameras disposed about the nozzle and oriented in a direction of the workpiece, each of the plurality of cameras configured to capture a corresponding plurality of images of the workpiece; and a retractable touch probe offset from the nozzle a greater distance than the plurality of cameras; and a processing device for generating a composite image from the plurality of images.

2. The device of claim 1, wherein the aperture has a diameter ranging from 50 microns to 100 microns.

3. The device of claim 2, wherein the diameter is 70 microns.

4. The device of claim 1, wherein the camera system comprises two cameras to ten cameras.

5. The device of claim 1, wherein the camera system comprises four cameras to eight cameras.

6. The device of claim 5, wherein the camera system comprises four cameras.

7. The device of claim 1 and further comprising: a display for displaying the composite image.

8. A method of forming a feature in a workpiece, the method comprising:

orienting a waterjet guided laser device about the workpiece by:

aligning a head assembly with the work piece, the head assembly comprising a plurality of cameras, a nozzle, and a retractable touch probe, wherein the plurality of cameras is disposed about the nozzle and the retractable touch probe is offset from the nozzle a greater distance than the plurality of cameras;

capturing a plurality of images of the workpiece with corresponding cameras of the plurality of cameras;

generating a composite image from the plurality of images; and aligning the nozzle of the waterjet guided laser device to the workpiece based on the composite image;

ejecting a waterjet from an aperture of the nozzle; and impinging the waterjet against the workpiece causing a corresponding removal of material therefrom.

9. The method of claim 8 and further comprising: positioning the waterjet guided laser device such that the plurality of cameras are offset a distance from the workpiece.

10. The method of claim 9, wherein the distance ranges from 0.5 in to 1.5 in.

11. The method of claim 10, wherein the aperture has a diameter ranging from 50 microns to 100 microns.

12. The method of claim 8, wherein the plurality of cameras comprises two cameras to ten cameras.

13. The method of claim 8, wherein the plurality of cameras comprises four cameras to eight cameras.

14. The method of claim 8 and further comprising: displaying the composite image on a display.

15. The method of claim 8, wherein a processing device generates the composite image.

16. The method of claim 8, wherein the step of impinging the waterjet against the workpiece comprises impinging the waterjet against a partially formed feature in the workpiece.

17. The method of claim 8, wherein aligning the nozzle of the waterjet guided laser device to the workpiece comprises aligning the nozzle to an aperture of the workpiece.

18. The device of claim 1, wherein the plurality of cameras are disposed equidistant about a perimeter of the nozzle.

* * * * *